May 9, 1967 B. BEJACH 3,318,546

TAPE TRANSPORT SYSTEM

Filed Sept. 28, 1964

INVENTOR:
Benton Bejach
By Smyth, Roston & Pavitt
Attorneys

United States Patent Office 3,318,546
Patented May 9, 1967

3,318,546
TAPE TRANSPORT SYSTEM

Benton Bejach, Los Angeles, Calif., assignor to Minnesota Mining and Manufacturing Company, St. Paul, Minn., a corporation of Delaware Filed Sept. 28, 1964, Ser. No. 399,517
9 Claims. (Cl. 242—55.12)

This invention relates to a tape transport system and, more particularly, pertains to a tape transport system of the type that actuates the tape by employing resilient nip-roller means to press the tape against the periphery of a power actuated drive capstan.

In a well known arrangement, for example, a return idler cooperates with a differential drive capstan to form the traveling tape into a loop adjacent a transducer station and two nip-rollers press the two legs of the loop against opposite sides of the drive capstan with a differential effect to place the loop under tension. Suitable guide means routes the tape from a supply reel to the drive capstan and from the drive capstan to a take-up reel.

In some tape installations, for example in certain tape installations for instrumentation, it is highly desirable that the transport system be capable of starting and stopping the tape as nearly instantly as possible. In other words, the need is for the tape at the transducer station to accelerate to full speed substantially instantly when the nip-roller means initially presses the tape against the drive capstan and the further need is for the tape to decelerate substantially instantly when the nip-roller means is retracted from the drive capstan. The difficulty is that the whole tape is in motion with large masses concentrated at the two reels and the inertia of the total mass prevents the tape from responding instantly to the action of the nip-roller means.

The present invention meets this difficulty by, in effect, isolating the inertia effects of the masses at the two reels from the portion of the tape in the region of the transducer station. Consequently the inertia of only a small mass of only a few inches of the tape is involved in starting and stopping the tape. The rate of acceleration varies with $F/M$ where F is the applied force and M is the mass involved. It may be readily appreciated, therefore, that since the actuating force exerted by the drive capstan is quite high, the acceleration of the few inches of tape is nearly instantaneous. When the nip-roller means is retracted from the rotating drive capstan, the force F that is effective in decelerating the tape is the frictional resistance engendered at the various means for guiding the tape. The important fact, however, is that the mass of the few inches of tape is so exceedingly low that the frictional resistance is effective to stop the tape substantially instantly.

Isolation of the two inertia effects at the two reels is accomplished by storing portions of the traveling tape adjacent the two reels, respectively, with the storage functions controlled by two corresponding servo loops. The two servo loops automatically maintain appropriate normal quantities of the traveling tape in storage adjacent the two reels.

A first storage means stores a first portion of the traveling tape between the supply reel and the drive capstan. The normal amount of the first portion of tape that is stored adjacent the supply reel is sufficient to compensate for the lag in the rate of pay out of the tape by the supply reel behind the rate of actuation of the tape by the drive capstan when the transport of the tape by the drive capstan is abruptly started. A second storage means adjacent the take-up reel stores a second portion of the traveling tape between the drive capstan and the take-up reel. The second storage means normally stores sufficient tape to compensate for delay in stopping of the take-up reel when transport of the tape by the drive capstan is abruptly terminated. It is apparent that the two storage means cooperate to isolate the inertia effects at the two reels from the tape in the region of the transducer station to permit abrupt acceleration and deceleration of the tape in that region.

In the preferred practice of the invention, each storage means comprises means to form a storage loop of variable magnitude in the traveling tape. For this purpose the traveling tape may be looped around an idler roller which is mounted on a movable support with spring force acting on the movable support to tend to elongate the storage loop and thus place the storage loop under tension. The corresponding servo loop responds to changes in the position of the movable support and thus acts automatically to maintain a predetermined normal amount of the traveling tape in storage and at the same time to maintain the loop of tape at a predetermined tension. The normal amount of tape stored adjacent each of the two reels may differ but the same normal tension is maintained adjacent the two reels to balance the system when the tape is released from the drive capstan.

Such a system must be reversible to rewind the tape but a certain problem arises in reversing the direction of the tape in that the responsiveness of the two servo loops to changes in the tension or size of the corresponding storage loops must also be reversed. Thus the first servo loop must now decelerate instead of accelerating the first reel in response to increased tape tension and the second servo loop must accelerate instead of decelerating the second reel in response to increased tape tension.

This problem is solved in the preferred practice of the invention by creating signals of positive and negative electrical potential to control the two reels and by using direct current motors to drive the two reels. Reversing the direction of travel of the tape reverses the responsiveness of the motors to the two kinds of signals and thus makes it unnecessary to reverse the polarity of the controlling signals.

The features and advantages of the invention may be understood from the following detailed description and the accompanying drawings.

In the drawings, which are to be regarded as merely illustrative:

Figures 1, 2, 3, 4:
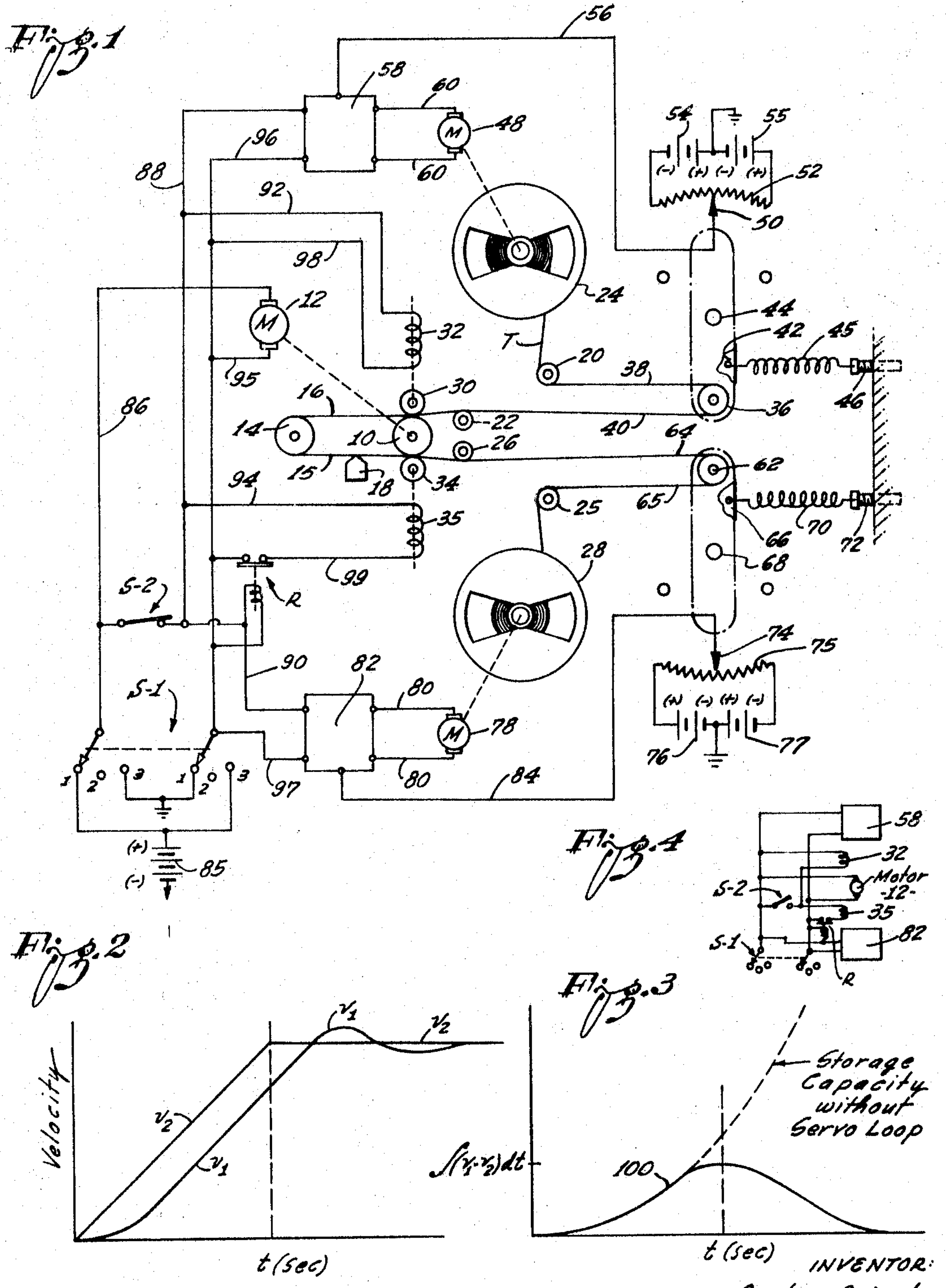
FIG. 1 is a diagram of the tape transport system including a wiring diagram of the control system.
FIG. 2 is a graph showing velocity relationships when actuation of the tape is initiated.
FIG. 3 is a graph showing how each of the tape storage means with its associated circuitry functions as a mechanical integrator.
FIG. 4 is a modified wiring diagram.

The system shown in FIG. 1 incorporates a well known capstan assembly in which a drive capstan 10 driven by a motor 12 cooperates with a return capstan or idler 14 to form a travelling tape T into a central loop that has an outgoing leg 15 and an ingoing leg 16 with suitable transducer means 18 located adjacent one of the two legs. Suitable guide means including guide rollers 20 and 22 lead the tape from a supply reel 24 to the capstan assembly and additional guide means including guide rollers 25 and 26 lead the tape from the capstan assembly to a take-up reel 28.

To drive the tape, a first nip roller 30 actuated by a solenoid 32 presses the ingoing leg 16 of the central tape loop against the drive capstan 10 and a second nip-roller 34 actuated by a solenoid 35 presses the outgoing leg 15 of the tape against the other side of the drive capstan. It is to be noted that the two guide rollers 22 and 26 are so positioned that they spread the two tape legs 15 and 16 apart out of contact with the drive capstan 10 whenever the two nip-rollers 30 and 34 are retracted by deenergization of the two solenoids.

The drive capstan 10 is what is known as a differential capstan to cause the outgoing leg 15 of the tape to travel at a slightly higher velocity than the ingoing leg 16 to place the traveling tape under a desirable degree of tension as the tape passes the transducer means 18. Such a differential drive capstan and the associated nip-rollers 30 and 34 may be constructed as taught in the Mullin Patent 3,093,284 wherein the drive capstan has different regions of different diameters for cooperation with the two nip-rollers.

In accord with the teachings of the present invention, a storage roller 36 cooperates with the guide rollers 20 and 22 to form a first portion of the tape into a first storage loop having an ingoing leg 38 and an outgoing leg 40. For this purpose the storage roller 36 is carried by a suitable movable support in the form of a lever 42 mounted on a pivot 44. A suitable spring 45 anchored to an adjustable screw 46 acts on the lever 42 to tend to extend or increase the storage loop.

The supply reel 24 is driven by a motor 48 the speed of which is controlled in response to changes in magnitude of the loop that is stored by the action of the storage roller 36. For this purpose the second arm of the lever 42 carries a wiper or brush 50 that traverses a potentiometer resistor 52. One end of the resistor 52 is in series with a grounded battery 54 and the other end of the resistor is in series with a second similar battery 55 of the same polarity. Thus when the wiper 50 is in the neutral position shown in FIG. 1 the wiper is at zero voltage. If the wiper 50 is shifted rightward from its neutral position in response to decrease in the magnitude of the loop stored by the storage roller 36, the wiper is charged with increasing positive voltage and, on the other hand, if the wiper shifts leftward from its neutral position in response to increase in magnitude of the loop stored by the storage roller 36 the wiper is charged with increasing negative voltage.

The wiper 50 is connected by a conductor 56 with a control unit 58 which in turn is connected to the supply reel motor 48 by a pair of wires 60. The control unit 58 which is connected to a suitable source of direct current is of a well known construction which varies the speed of the motor 48 in accord with the signals from the wiper 50 of the tape storage means. Thus when the magnitude of the storage loop increases unduly the wiper 50 sends a negative voltage signal to the control unit 58 to slow down the motor 48 and when the magnitude of the control loop decreases the wiper 50 sends a positive voltage signal to the control unit to accelerate the supply reel.

A second storage roller 62 cooperates with the guide rollers 25 and 26 to form a second portion of the tape into a second storage loop having an ingoing leg 64 and an outgoing leg 65. Here again the storage roller 62 is carried by a movable support in the form of a second lever 66 mounted on a pivot 68. A second spring 70 anchored to a second adjustment screw 72 acts on the lever 66 to tend to extend or increase the second storage loop.

The second arm of the lever 66 carries a brush or wiper 74 which traverses a potentiometer resistor 75. One end of the resistor 75 is in series with a grounded battery 76 and the second end is in series with a second similar grounded battery 77, the polarity of the two batteries 76 and 77 being opposite to the polarity of the two previously mentioned batteries 54 and 55. Thus when the wiper 74 moves rightward from its neutral position the wiper is charged negatively with increasing voltage and when the wiper shifts to the left it is charged positively with increasing voltage.

The take-up reel 28 is actuated by a motor 78 in accord with changes in magnitude of the second storage loop. For this purpose the motor 78 is connected by a pair of wires 80 to a control unit 82 which in turn is connected to a suitable source of direct current. The wiper 74 is connected to the control unit 82 by a conductor 84.

Here again the control unit 82 is of a well known construction to vary the speed of the motor in accord with the polarity and voltage of the signals from the wiper 74. When the second storage loop increases in magnitude the wiper 74 shifts leftward in FIG. 1 to send a positive signal to the control unit 82 to accelerate the take-up reel 28. On the other hand, when the second storage loop decreases in magnitude the wiper 74 shifts to the right to send a negative voltage signal to the control unit 82 to retard the motor 78.

FIG. 1 shows circuitry which may be employed to control the three motors 12, 48 and 78 as well as the two solenoids 32 and 35. A master control switch S–1 has two arms as shown which are movable to three different positions as indicated for controlling current flow from a grounded main battery 85. For the purpose of claiming the invention the master control switch S–1 may be termed a first control means. The circuitry further includes an auxiliary switch S–2 which is closed when it is desired to place the whole system under the control of the main switch S–1 and which may be used if desired to control the two solenoids 32 and 35 and the two motors 48 and 78 independently of the capstan motor 12. For the purpose of claiming the invention the switch S–2 may be termed a second control means.

With the main switch S–1 in its first position as shown and with the auxiliary switch S–2 closed as shown the positive side of the main battery 85 is connected to the capstan motor 12 by a wire 86 and through the closed switch S–2 is connected to the control unit 58 by a wire 88 and to the second control unit 82 by a wire 90. Also through the closed switch S–2 the positive side of the main battery 85 is connected to the solenoid 32 by a wire 92 and is connected to the solenoid 35 by a wire 94. At the same time the grounded switch arm of the main switch S–1 is connected to the motor 12, the first control unit 58, the second control unit 82, the solenoid 32, and the solenoid 35 by wires 95, 96, 97, 98 and 99, respectively.

When the main switch S–1 is in its second position the main battery is cut off from the three motors and the two solenoids to stop the tape. When the main switch S–1 is in its third position it connects the main battery 85 to the three motors for reversed flow of the direct current therethrough and at same time energizes one of the two solenoids for rewinding the tape.

It is apparent that with the auxiliary switch S–2 closed, the main switch S–1 starts and stops the three motors in unison and at the same time simultaneously energizes and deenergizes the two solenoids 32 and 35 as required. In the first position of the main switch the tape travels from the supply reel 24 to the capstan assembly and from the capstan assembly to the take-up reel 28. In the third position of the main switch S–1 the tape travels in the opposite direction to rewind the tape on the supply reel 24. Thus each of the two reels 24 and 28 functions as a supply reel or a take-up reel in accord with the direction of tape travel.

Since only one nip-roller should be used for rewinding the tape, a polarized relay R controls the flow of current to the solenoid 35. When the direction of current flow is reversed for rewinding the tape, the relay R deenergizes solenoid 35.

With the main switch S–1 in either its first position or its third position and with the auxiliary switch S–2 in its open position, the motor 12 actuates the drive capstan 10 in one of its two rotary directions and the auxiliary switch S–2 is used to control the running of the tape. The advantage of employing the auxiliary switch S–2 in this manner is that the drive capstan 10 may be accelerated to full speed before the two nip rollers 30 and 34 are actuated by the two corresponding solenoids to press the tape against the drive capstan. Thus the starting inertia of the drive capstan 10 and its motor 12 are not involved in initiating travel of the tape.

In the functioning of the first tape storage means comprising the first storage roller 36 together with the associated lever 42 and spring 45, the wiper 50 continually seeks a position at which the first storage loop of tape is of normal size. At this normal position of the tape storage means, the spring 45 exerts a normal force to hold the tape in storage under a normal tension. For example the normal tension for one-half inch tape may be 4 ounces and therefore the normal force exerted by the spring 45 may be 8 ounces. If the tape is one inch wide the tape tension should be 8 ounces and the force exerted by the spring 45 should be 16 ounces.

Since the force exerted by the spring 45 depends upon the degree to which the spring is stressed, the tension created in the traveling tape by the spring varies inversely with the size of the storage loop. Thus the first servo loop which includes the wiper 50 and the control unit 58 may be regarded either as sensing and responding to changes in the size of the first storage loop or as sensing and responding to changes in the tension of the tape between the supply reel 24 and the drive capstan 10 and, accordingly, the servo loop may be regarded as functioning either to maintain a normal amount of traveling tape in storage or to maintain a predetermined normal tension in the tape that travels to the drive capstan.

With respect to maintaining tension in the traveling tape, the lever 42 carrying the storage roller 36 and subjected to the force of the spring 45 cooperates with the potentiometer to serve as a tension-regulating transducer and actually functions as a mechanical integrator wherein $$S=\int(V_1-V_2)dt$$

$V_1$ being the velocity at which the tape is released by the supply reel, i.e., the velocity of the ingoing leg 38 of the storage loop, and $V_2$ being the velocity at which the tape is driven by the drive capstan, i.e., the velocity of the outgoing leg 40 of the storage loop. This integrating function is apparent from the fact that the loop increases progressively when the velocity of the tape released by the supply reel 24 exceeds the velocity imparted to the tape by the drive capstan and vice versa.

When the two nip rollers 30 and 34 initially press the tape against the rotating drive capstan 10, the tape of the two legs of the first storage loop behaves in a manner indicated in FIG. 2 wherein the velocity $V_2$ of the outgoing leg 40 of the first storage loop is abruptly accelerated to a plateau of steady velocity. The velocity $V_1$ of the ingoing leg 38 of the first storage loop initially falls behind the velocity $V_2$ as indicated in FIG. 2 but seeks the same plateau to cause both legs of the first storage loop to travel at the same rate with the storage loop of a normal magnitude.

Since the velocity $V_1$ of the ingoing leg of the storage loop lags behind the velocity $V_2$ of the outgoing leg of the storage loop, a corresponding amount of tape is taken out of the storage loop to accommodate the difference in velocity and the normal magnitude of the first storage loop must be sufficient to compensate for the lag of $V_1$ behind $V_2$. On the other hand, when the nip-rollers 30 and 34 are retracted to release the tape from the drive capstan 10, the velocity of the outgoing leg 40 of the first storage loop drops abruptly to zero but the supply reel 24 is decelerated less abruptly and tends to overrun slightly to increase the size of the storage loop. It is apparent that the storage capacity of the first storage means must be sufficient to take in the small amount of tape that is released by overrunning of the supply reel 24.

With further reference to the first storage loop, the curve 100 in FIG. 3 represents the function of the automatically controlled storage loop as a mechanical integrator. On the rising slope of the curve 100 the first storage loop is giving up tape when the system is first started, the tape being given up to compensate for the lag of the supply reel. For example, the release of only one inch of tape may be sufficient. The downward slope of curve 100 represents the subsequent return of the tape to storage.

Turning now to the second storage loop associated with the take-up reel 28, when the system is stopped the lag in the stopping of the take-up reel causes the size of the second storage loop to increase beyond normal and when the system is again started the second storage loop temporarily decreases. Thus the function of the second storage loop is opposite from the function of the first storage loop in that it temporarily takes in a quantity of tape when the system is started and temporarily gives up a quantity of tape when the system is subsequently stopped whereas the first storage loop temporarily gives up a quantity of tape when the system is started and temporarily gives up a quantity of tape when the system is stopped.

When the system is started the two velocities in the second storage loop behave in a manner shown in FIG. 2 with the velocities reversed, i.e., with the velocity $V_1$ of the ingoing leg 62 rising abruptly to a steady state plateau and the velocity $V_2$ of the outgoing leg 65 seeking the same plateau. FIG. 3 also applies to the second storage loop with the rising slope of curve 100 representing the tape temporarily taken into storage when the system is started, the tape being taken into storage to compensate for the lag of the take-up reel and the downward slope representing the tape that is temporarily taken out of storage when the system stops.

The manner in which the described tape transport system operates to serve its purpose may be readily understood from the foregoing description. The two springs 45 and 70 are adjusted by means of the associated screws 46 and 72 to exert the same force when both wipers are at their neutral positions. With the main switch S–1 at its No. 2 position and the auxiliary switch S–2 closed, all three motors may be energized either by changing the main switch to its first position for movement of the tape in one direction or by changing the main switch to its second position for travel of the tape in the opposite direction. Movement of the main switch to its first position causes the two solenoids 32 and 35 to be energized to cause both of the nip-rollers 30 and 34 to press the tape against the drive capstan for actuation of the tape. On the other hand, if the main switch is moved to its third position to reverse the motors, only one nip-roller is operated. If it is desired to eliminate the inertia of the drive capstan and the associated motor 12 in the starting of the tape, the switch S–2 may be opened before the main switch S–1 is moved out of its second position. With the auxiliary switch S–2 open, the main switch S–1 merely controls energization of the drive capstan motor and its direction of rotation. Thus with the auxiliary switch S–2 open, the main switch S–1 is first changed to either its first or third position to start the drive capstan and then subsequently the auxiliary switch S–2 is manipulated to control the nip-rollers to start and stop the tape.

Since the two servo loops effectively isolate the two reels from the portion of the tape at the capstan assembly only the mass of the relatively few inches of tape in the region of the capstan assembly is involved in starting and stopping the tape. Consequently the tape starts and stops abruptly. When the two nip rollers 30 and 34 are retracted by the two solenoids the tape is immediately flexed out of contact with the drive capstan 10 by the two guide rollers 22 and 26 and the tape abruptly stops because the tape remains under tension to make the braking effect of the various guide rollers effective and the friction at the various guide rollers including the return capstan 14 is highly effective because of the small mass of tape that is involved.

When the main switch S–1 is in its first position, positive voltage signals increase the speed of the supply reel 24 to increase the size of the first storage loop and positive signals increase the speed of the take-up reel 28 to shorten the second storage loop. When the main switch is shifted to its third position to reverse the direction of the drive capstan 10, the reversal is accomplished by reversing the current flow to the two motors 48 and 78. With the current flow through the two motors reversed, reel 28 which now serves as a supply reel receives negative voltage signals to speed up when the second storage loop decreases in size and reel 24 which now serves as a take-up reel receives negative signals to speed up when the first storage loop increases in size.

It will be apparent to those skilled in the art that the reversal in the responsiveness of the two servo loops when the direction of the tape is reversed, may be accomplished by arrangements differing from the arrangement in the present embodiment of the invention. For example reversing switches may be incorporated in the two control units 58 and 82 with the reversing switches interlocked with the main switch S–1.

FIG. 4 shows how the wiring diagram of FIG. 1 may be modified to place only the two solenoids 32 and 35 under the control of the auxiliary switch S–2 with the three motors under control of the main switch S–1. In the operation of this modified control system the main switch S–1 or first control means is first adjusted to run the three motors in the desired direction and then the auxiliary switch S–2 or second control means is closed and opened to start and stop the tape. The advantage of this arrangement is that the motors controlling the two reels 24 and 28 under the regulation of the two servo loops are effective before the tape starts and after the tape stops. Consequently each of the two storage loops is immediately restored to its normal magnitude after the tape stops and again is restored to its normal size immediately after the tape is started. Thus when the tape is started the first storage loop is momentarily shortened and the second storage loop is momentarily lengthened and when the tape is stopped the first storage loop is momentarily lengthened and the second storage loop is momentarily shortened.

My description in specific detail of the selected embodiment of the invention will suggest various changes, substitutions and other departures from my disclosure within the spirit and scope of the appended claims.

I claim:

1. In a tape transport system wherein a tape traveling from a first power driven supply reel to a second power driven taken-up reel is conducted past a transducer station by tape guide means and a drive capstan assembly and wherein retractable nip-roller means presses the tape against the drive capstan to actuate the tape, the improvement comprising:

a first direct current motor to actuate the supply reel, said motor being reversible in response to reverse in the direction of current flow therethrough;

first responsive means responsive to the tension in a first portion of the tape between the supply reel and the drive capstan to create signals of one polarity when the tension in the first portion of the tape rises above a predetermined magnitude and to create signals of the opposite polarity when the tension in the first portion drops below the predetermined magnitude;

first regulating means for the first motor to energize the motor in the direction to lower said tension in response to the signals of the one polarity from the first responsive means and to energize the motor in the direction to increase said tension in response to the signals of the opposite polarity thereby to maintain the tension of the first portion of the tape substantially at said predetermined magnitude;

a second direct current motor to actuate the take-up reel, said second motor being reversible in response to reverse in the direction of current flow therethrough;

a second responsive means responsive to the tension in a second portion of the tape between the drive capstan and the take-up reel to create signals of a given polarity when the tension in the second portion drops below a given magnitude and to create signals of the polarity opposite to the given polarity when the tension in the second portion rises above the given magnitude;

a second regulating means for the second motor to energize the motor in the direction to raise the tension in said second portion in response to the signals of said given polarity from the second responsive means and to energize the second motor in the direction to lower the tension in said second portion in response to signals of the polarity opposite from the given polarity from the second responsive means, thereby to maintain the tension of said second portion of the tape substantially at said given magnitude; and control means to reverse the direction of rotation of the drive capstan thereby to change the take-up reel to a supply reel and change the supply reel to a take-up reel, said control means being effective also to reverse the direction of current flow through the two motors to reverse the effect on the two motors of the polarity of said signals.

2. In a tape transport system wherein a tape traveling from a first power driven supply reel to a second power driven take-up reel is conducted past a transducer station by tape guide means and a drive capstan and wherein means retractably presses the tape against the drive capstan to actuate the tape, the improvement comprising:

a first direct current motor to actuate the supply reel, said motor being reversible in response to reverse in the direction of current flow therethrough;

means to form a first loop in a first portion of the traveling tape between the supply reel and the drive capstan;

means to exert force on the first loop-forming means to tend to increase the size of the first loop whereby the first loop increases in size when the rate at which the tape is released by the supply reel exceeds the rate in which the tape is driven by the drive capstan and vice versa;

first responsive means responsive to changes in the magnitude of the first loop to create signals of one polarity when the size of the loop drops below a predetermined magnitude and to create signals of the opposite polarity when the size of the loop rises above the predetermined magnitude with both signals increasing in voltage with increasing departure from the predetermined magnitude;

first regulating means for the first motor to energize the motor in the direction to increase the size of the loop in accord with the voltage of the signals of the first polarity from the first responsive means and to energize the motor in the direction to decrease the size of the loop in accordance with the voltage of the signals of the opposite polarity from the first responsive means thereby to maintain the size of the first loop substantially at the predetermined magnitude;

a second direct current motor to actuate the take-up reel, said second motor being reversible in response to reverse in the direction of current flow therethrough;

means to form a second loop in a second portion of the traveling tape between the drive capstan and the take-up reel;

means to exert force on the second loop-forming means to tend to increase the size of the second loop whereby the second loop decreases in size when the rate at which the tape is taken up by the take-up reel exceeds the rate at which the tape is driven by the drive capstan and vice versa;

second responsive means responsive to changes in the magnitude of the second loop to create signals of a given polarity when the size of the second loop drops below a given magnitude and to create signals of the polarity opposite to the given polarity when the size of the second loop rises above the predetermined magnitude with both signals increasing in polarity with increasing departure from the given magnitude;

second regulating means for the second motor to energize the motor in the direction to increase the size of the second loop in accord with the voltage of the signals of the given polarity from the second responsive means and to energize the second motor in a direction to decrease the size of the second loop in accord with the voltage of the signals of the polarity opposite to the given polarity from the second responsive means thereby to maintain the size of the second loop at substantially the given magnitude; and control means to reverse the direction of rotation of the drive capstan thereby to change the take-up reel to a supply reel and change the supply reel to a take-up reel, said control means being effective also to reverse the direction of current flow through the two motors to reverse the effect on the two motors of the polarity of said signals.

3. The improvement as set forth in claim 2 in which said tape-pressing means comprises two nip-rollers cooperative with the drive capstan to form the tape into a tensioned loop at the transducer station;

and which includes automatic means to actuate both of the nip-rollers when the drive capstan draws tape from the supply reel and to actuate only one of the two nip-rollers when the drive capstan returns tape to the supply reel.

4. In a tape transport system wherein a tape traveling from a first power driven supply reel to a second power driven take-up reel is conducted past a transducer station by tape guide means and a drive capstan wherein two retractible nip rollers press the tape against the drive capstan to drive the tape in one direction and to form the tape into a tensioned loop at the transducer station, the improvement comprising:

a first direct current motor to actuate the supply reel, said motor being reversible in response to reverse in the direction of current flow therethrough;

means to form a first loop in a first portion of the traveling tape between the supply reel and the drive capstan;

means to exert force on the first loop-forming means to tend to increase the size of the first loop whereby the first loop increases in size when the rate at which the tape is released by the supply reel exceeds the rate in which the tape is driven by the drive capstan and vice versa;

first responsive means responsive to changes in the magnitude of the first loop to create signals of one polarity when the size of the loop drops below a predetermined magnitude and to create signals of the opposite polarity when the size of the loop rises above the predetermined magnitude with both signals increasing in voltage with increasing departure from the predetermined magnitude;

first regulating means for the first motor to energize the motor in the direction to increase the size of the loop in accord with the voltage of the signals of the first polarity from the first responsive means and to energize the motor in the direction to decrease the size of the loop in accord with the voltage of the signals of the opposite polarity from the first responsive means thereby to maintain the size of the first loop substantially at the predetermined magnitude;

a second direct current motor to actuate the take-up reel, said second motor being reversible in response to reverse in the direction of current flow therethrough;

means to form a second loop in a second portion of the traveling tape between the drive capstan and the take-up reel;

means to exert force on the second loop-forming means to tend to increase the size of the second loop whereby the second loop decreases in size when the rate at which the tape is taken up by the take-up reel exceeds the rate at which the tape is driven by the drive capstan and vice versa;

second responsive means responsive to changes in the magnitude of the second loop to create signals of a given polarity when the size of the second loop drops below a given magnitude and to create signals of the polarity opposite to the given polarity when the size of the second loop rises above the predetermined magnitude with both signals increasing in polarity with increasing departure from the given magnitude;

second regulating means for the second motor to energize the motor in the direction to increase the size of the second loop in accord with the voltage of the signals of the given polarity from the second responsive means and to energize the second motor in a direction to decrease the size of the second loop in accord with the voltage of the signals of the polarity opposite to the given polarity from the second responsive means thereby to maintain the size of the second loop at substantially the given magnitude;

control means to reverse the direction of rotation of the drive capstan thereby to change the take-up reel to a supply reel and change the supply reel to a take-up reel, said control means being effective also to reverse the direction of current flow through the two motors to reverse the effect on the two motors of the polarity of said signals; and automatic means to actuate both of the nip rollers when the drive capstan draws tape from the supply reel and to actuate only one of the two nip rollers when the drive capstan returns tape to the supply reel, said automatic means being responsive to reversal of current flow through the two motors.

5. The improvement as set forth in claim 4 in which the two nip-rollers are actuated by two solenoids respectively;

in which the current for the two solenoids reverses when the current flow reverses through the two motors;

and which includes a polarized relay energized by the reversible current to de-energize one of the two solenoids when the current flow through the two motors is reversed to rewind the tape.

6. In a tape transport system wherein a tape traveling from a first power driven supply reel to a second power driven take-up reel is conducted past a transducer station by tape guide means and a drive capstan and wherein means retractably presses the tape against the drive capstan to actuate the tape, the improvement comprising:

a first direct current motor to actuate the supply reel;

means to form a first loop in a first portion of the traveling tape between the supply reel and the drive capstan;

means to exert force on the first lop-forming means to tend to increase the size of the first loop whereby the first loop increases in size when the rate at which the tape is released by the supply reel exceeds the rate in which the tape is driven by the drive capstan and vice versa;

first responsive means responsive to changes in the magnitude of the first loop to create signals of one polarity when the size of the loop drops below a predetermined magnitude and to create signals of the opposite polarity when the size of the loop rises above the predetermined magnitude with both signals increasing in voltage with increasing departure from the predetermined magnitude;

first regulating means for the first motor to energize the motor in the direction to increase the size of the loop in accord with the voltage of the signals of the first polarity from the first responsive means and to energize the motor in the direction to decrease the size of the loop in accord with the voltage of the signals of the opposite polarity from the first responsive means thereby to maintain the size of the first loop substantially at the predetermined magnitude;

a second direct current motor to actuate the take-up reel;

means to form a second loop in a second portion of the traveling tape between the drive capstan and the take-up reel;

means to exert force on the second loop-forming means to tend to increase the size of the second loop whereby the second loop decreases in size when the rate at which the tape is taken up by the take-up reel exceeds the rate at which the tape is driven by the capstan assembly and vice versa;

second responsive means responsive to changes in the magnitude of the second loop to create signals of a given polarity when the size of the second loop drops below a given magnitude and to create signals of the polarity opposite to the given polarity when the size of the second loop rises above the given magnitude with both signals increasing in voltage with increasing departure from the given magnitude;

second regulating means for the second motor to energize the motor in the direction to increase the size of the second loop in accord with the voltage of the signals of the given polarity from the second responsive means and to energize the second motor in a direction to decrease the size of the second loop in accord with the voltage of the signals of the polarity opposite to the given polarity from the second responsive means thereby to maintain the size of the second loop at substantially the given magnitude;

a first control means operable in a first respect to actuate the drive capstan in one direction to draw tape from the supply reel and operable in a second respect to actuate the drive capstan in the opposite direction to rewind the tape on the supply reel; and second control means operable in one respect to actuate the tape-pressing means and to cause direct current to flow through the two motors in one direction, the second control means being operable in a second respect to actuate the tape-pressing means and to reverse the direction of current flow through the two motors with consequent reversal of the effect of the polarity of said signals on the two motors when the drive capstan is reversed to rewind the tape.

7. The improvment as set forth in claim 6 in which the first control means is a first switch and the second control means is a second switch and the second switch is in series with the first switch to be energized therethrough, whereby with both switches open the first switch may be closed to start the drive capstan and after a time delay the second switch may be closed to operate the tape-pressing means, or with the first switch open and the second switch closed, the first switch may be closed to cause simultaneous operation of the drive capstan and the tape-pressing means.

8. In a tape transport system wherein a tape traveling from a first power driven supply reel to a second power driven take-up reel is conducted past a transducer station by tape guide means and a drive capstan and wherein means retractably presses the tape against the drive capstan to actuate the tape, the improvement comprising:

a first direct current motor to actuate the supply reel;

means to form a first loop in a first portion of the traveling tape between the supply reel and the drive capstan;

means to exert force on the first loop-forming means to tend to increase the size of the first loop whereby the first loop increases in size when the rate at which the tape is released by the supply reel exceeds the rate in which the tape is driven by the drive capstan and vice versa;

first responsive means responsive to changes in the magnitude of the first loop to create signals of one polarity when the size of the loop drops below a predetermined magnitude and to create signals of the opposite polarity when the size of the loop rises above the predetermined magnitude with both signals increasing in voltage with increasing departure from the predetermined magnitude;

first regulating means for the first motor to energize the motor in the direction to increase the size of the loop in accord with the voltage of the signals of the first polarity from the first responsive means and to energize the motor in the direction to decrease the size of the loop in accord with the voltage of the signals of the opposite polarity from the first responsive means thereby to maintain the size of the first loop substantially at the predetermined magnitude;

a second direct current motor to actuate the take-up reel;

means to form a second loop in a second portion of the traveling tape between the drive capstan and the take-up reel;

means to exert force on the second loop-forming means to tend to increase the size of the second loop whereby the second loop decreases in size when the rate at which the tape is taken up by the take-up reel exceeds the rate at which the tape is driven by the capstan assembly and vice versa;

second responsive means responsive to changes in the magnitude of the second loop to create signals of a given polarity when the size of the second loop drops below a given magnitude and to create signals of the polarity opposite to the given polarity when the size of the second loop rises above the given magnitude;

second regulating means for the second motor to energize the motor in the direction to increase the size of the second loop in accord with the voltage of the signals of the given polarity from the second responsive means and to energize the second motor in a direction to decrease the size of the second loop in accord with the voltage of the signals of the polarity opposite to the given polarity from the second responsive means thereby to maintain the size of the second loop at substantially the given magnitude;

first control means operable in one respect to actuate the drive capstan in the direction to draw tape to the supply reel and to cause current flow in one direction through the two motors, the first control means being operable in a second respect to actuate the drive capstan in the direction to rewind the tape and to reverse the direction of current flow through the two motors to reverse the effect of the polarity of said signals; and second control means to operate the tape-pressing means.

9. The improvement as set forth in claim 8 in which the first control means is a first switch and the second control means is a second switch and the second switch is in series with the first switch to be energized therethrough, whereby with both switches open the first switch may be closed to start the drive capstan and after a time delay the second switch may be closed to operate the tape-pressing means, or with the first switch open and the second switch closed, the first switch may be closed to cause simultaneous operation of the drive capstan and the tape-pressing means.

References Cited by the Examiner

UNITED STATES PATENTS

| | | | |
|---|---|---|---|
| 2,656,129 | 10/1953 | De Turk et al. ---- | 242—75.51 |
| 2,854,197 | 9/1958 | MacNeill --------- | 242—55.12 |
| 2,904,275 | 9/1959 | Selsted et al. ------ | 242—55.12 |
| 2,913,192 | 11/1959 | Mullin ----------- | 242—55.11 |
| 2,985,396 | 5/1961 | Johnson ---------- | 242—55.12 |
| 3,105,179 | 9/1963 | Young et al. ---- | 242—75.51 X |
| 3,155,339 | 11/1964 | Groenewegen ------ | 242—75.51 |

FRANK J. COHEN, *Primary Examiner.*

G. F. MAUTZ, *Examiner.*